United States Patent
Graves

(10) Patent No.: US 7,194,159 B1
(45) Date of Patent: Mar. 20, 2007

(54) ASYMMETRIC OPTICAL CIRCULATOR

(75) Inventor: J. Elon Graves, Los Gatos, CA (US)

(73) Assignee: AOptix Technologies, Inc., Campbell, CA (US)

( * ) Notice: Subject to any disclaimer, the term of this patent is extended or adjusted under 35 U.S.C. 154(b) by 0 days.

(21) Appl. No.: 11/305,888

(22) Filed: Dec. 16, 2005

Related U.S. Application Data

(60) Provisional application No. 60/639,850, filed on Dec. 27, 2004.

(51) Int. Cl.
*G02B 6/26* (2006.01)

(52) U.S. Cl. ............................ 385/31; 385/27; 385/39; 385/92

(58) Field of Classification Search ............... 385/31, 385/27, 39, 92
See application file for complete search history.

(56) References Cited

U.S. PATENT DOCUMENTS 6,721,510 B2    4/2004   Graves et al.
2003/0034431 A1*   2/2003   Mandella et al. ........ 250/201.3

* cited by examiner

*Primary Examiner*—Frank G. Font
*Assistant Examiner*—Michael P. Mooney
(74) *Attorney, Agent, or Firm*—Fenwick & West LLP

(57) ABSTRACT

An asymmetric optical circulator has three ports: a first fiber optic port, a second free space port, and a third fiber optic port. Light entering the first port exits the second port, and light entering the second port exits the third port. However, the two fiber ports are not the same. Instead, the two optical fibers have different coupling characteristics.

27 Claims, 4 Drawing Sheets

ASYMMETRIC OPTICAL CIRCULATOR

CROSS-REFERENCE TO RELATED APPLICATION

This application claims priority under 35 U.S.C. § 119(e) to U.S. Provisional Patent Application Ser. No. 60/639,850, "Asymmetric Optical Circulator," filed Dec. 27, 2004. The subject matter of the foregoing is incorporated herein by reference in its entirety.

BACKGROUND OF THE INVENTION

1. Field of the Invention

This invention relates to optical circulators, for example as are suitable for use in coupling to free space optical communications systems.

2. Description of the Related Art

An optical circulator is a basic building block for optical systems. An optical circulator is a nonreciprocal device. An optical signal that enters port 1 of the optical circulator exits from port 2, but an optical signal that enters port 2 does not exit from port 1. It exits from a different port 3 instead.

Because of their nonreciprocal nature, optical circulators have widespread application. For example, optical circulators are commonly used in fiber optic communications networks for wavelength routing and optical signal retrieval, such as wavelength division multiplexing (WDM). Optical circulators are also used in conjunction with erbium doped fiber amplifiers (EDFA), Raman amplifiers, optical add/drop multiplexers (OADM), dispersion compensators and optical time domain reflectometers (OTDR). Whenever an optical signal enters an optical component by one optical path and exits from the component by counter-propagating along the same optical path, an optical circulator is a candidate for separating the entering and exiting optical signals.

However, most, if not all, optical circulators that are used in fiber optic communications networks are symmetric. All of the ports typically are single mode fibers. Along the entering optical path, the optical circulator couples light from the port 1 single mode fiber to the port 2 single mode fiber. The light typically then propagates through some additional components and returns to the circulator propagating in the opposite direction along the port 2 single mode fiber. The circulator couples the returning light to the exit path along the port 3 single mode fiber. The symmetric design is generally preferred for fiber optic communications networks because single mode fibers are generally preferred due to their performance.

However, this approach is not suitable for all applications. For example, in a free space optical communications system, the light that is transmitted from a transceiver may have a well-defined Gaussian shape and therefore may arrive via a single mode fiber. However, due to effects such as aberrations along the free space optical communications link and overfilling of the receive aperture, the light received by a transceiver typically does not have such a tightly controlled mode and cannot be efficiently coupled back into a single mode fiber.

Therefore, there is a need for optical circulators that can accommodate different incoming and outgoing optical signals.

SUMMARY OF THE INVENTION

The present invention overcomes the limitations of the prior art by providing an asymmetric optical circulator. In one implementation, the circulator has three ports: a first fiber optic port, a second free space port, and a third fiber optic port. Light entering the first port exits the second port, and light entering the second port exits the third port. However, unlike many circulators used in fiber optic communications networks, the two fiber ports are not the same. Rather, the two optical fibers have different coupling characteristics.

In one design, the first port uses a single mode fiber and the third port uses a multimode fiber. Since the second port is a free space port, it can accommodate both the single mode fiber and the multimode fiber. This type of circulator can be used beneficially in free space optical communications systems. A telescope is operably coupled to the free space port of the circulator. Light entering the single mode fiber port is coupled into the telescope for transmission to a receiving telescope. Since the light comes from a single mode fiber, the telescope will transmit a diffraction-limited beam, thus concentrating energy at the receiving telescope. However, light received at the telescope typically is not diffraction-limited and, therefore, would be difficult to couple efficiently into a single mode fiber. Hence, in the receive direction, the third port is a multimode fiber. The received light is focused by the telescope onto the free space port, which then couples the light to the multimode fiber port.

Other aspects of the invention include methods corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
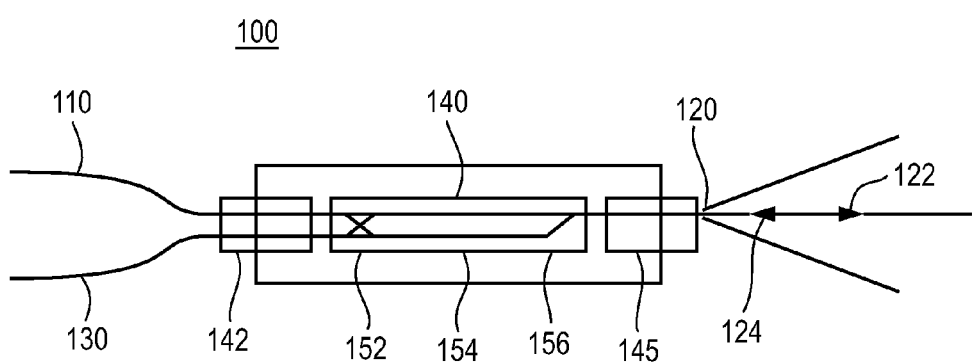
FIG. 1 is a diagram of an asymmetric optical circulator according to the present invention.

FIG. 1 is a diagram of an asymmetric optical circulator 100 according to the present invention. The circulator 100 includes three ports 110, 120 and 130 and a circulator core 140. The circulator, by definition, is a non-reciprocal device. Light that enters port 110 exits port 120, but light that enters port 120 exits port 130. The circulator core 140 implements the non-reciprocal function of the device.

In this asymmetric circulator, ports 110 and 130 both include optical fibers but the optical fibers are different and have different coupling characteristics (as opposed to both being single mode fibers, as is typically the case in fiber optic communications networks). Acceptance angle (or numerical aperture) and the size of the acceptance aperture (e.g., core diameter) are two examples of coupling characteristics that may be different between the optical fibers. In a preferred implementation, port 110 includes a single mode fiber and port 130 includes a multimode fiber, although other combinations of fibers can be used (e.g., different size multimode fibers).

Port 120 is a free space port. Light entering and exiting through this port propagates through free space. Light 122 leaving the circulator core 140 via port 120 propagates in a free space (i.e., unguided) mode. Similarly, light 124 entering the circulator core 140 via port 120 also propagates in a free space mode. Typically, the acceptance angle and size of the acceptance aperture of the free space port 120, when considered solely on its own, is fairly large. For example, optical beams that are entering the circulator core 140 via port 120 typically can be incident at a large number of different locations and at a large number of different angles and still couple efficiently into the circulator core 140. However, these beams may or may not couple efficiently between the circulator core 140 and the two fiber optic ports 110 and 130. Thus, the location of the fiber optic ports 110 and 130 determine the free space optical paths 122 and 124 of optical beams exiting and entering from port 120.

More specifically, in this example, light that enters the circulator core 140 via single mode fiber 110 exits through the free space port 120 along free space optical path 122. Light that enters the free space port 120 along free space optical path 124, which is counter-propagating with respect to optical path 122, is coupled by the circulator core 140 into multimode fiber 130.

The circulator core 140 implements the non-reciprocal nature of the device. Circulator cores typically utilize a combination of nonreciprocal polarization rotators (e.g., Faraday rotators) and polarization-sensitive components (e.g., birefringent components and/or wave plates). Polarization-insensitive circulator cores can be implemented by first splitting a randomly polarized optical beam into two differently polarized beams, manipulating each beam separately and then recombining the beams, as represented by the optical paths in sections 152, 154 and 156 of circulator core 140. In the reverse direction, the nonreciprocal nature of the different sections directs the exit beam to fiber port 130 rather than fiber port 110, as shown by the crossing optical paths in section 152.

There are two common design approaches for achieving the nonreciprocal optical paths. One approach uses nonreciprocal beam displacement. In other words, an optical beam entering from port 110 and exiting via port 120 is laterally displaced by a certain amount, and a beam entering from port 120 is laterally displaced by a different amount so that it exits via port 130 instead. The other approach uses angular displacement. An optical beam entering from port 110 is deflected in angle by a certain amount to exit at port 120, and a beam entering from port 120 is deflected by a different amount so that it exits at port 130. Lenses can be used to convert lateral displacement to angular displacement and vice versa.

In a preferred implementation, in FIG. 1, the optical fibers 110 and 130 are coupled to the circulator core 140 by a dual fiber collimator 142. On the other side of the circulator core 140, a GRIN lens 145 conditions the optical beam as it exits/enters via the free space port 120.

Figure 2:
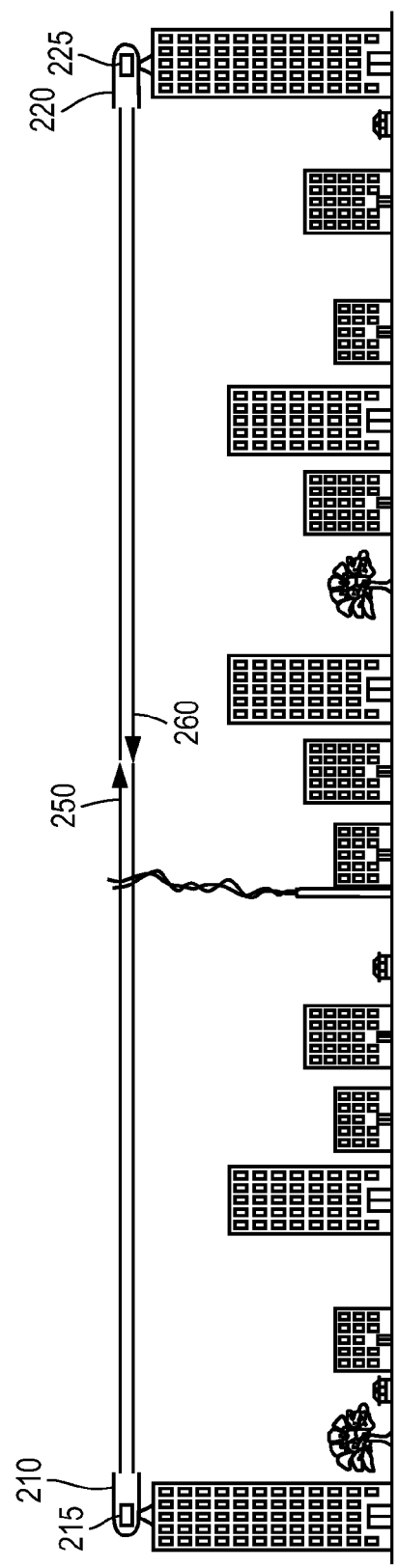
FIG. 2 is an illustration of a free space optical communications system suitable for use with the present invention.
Figure 3:
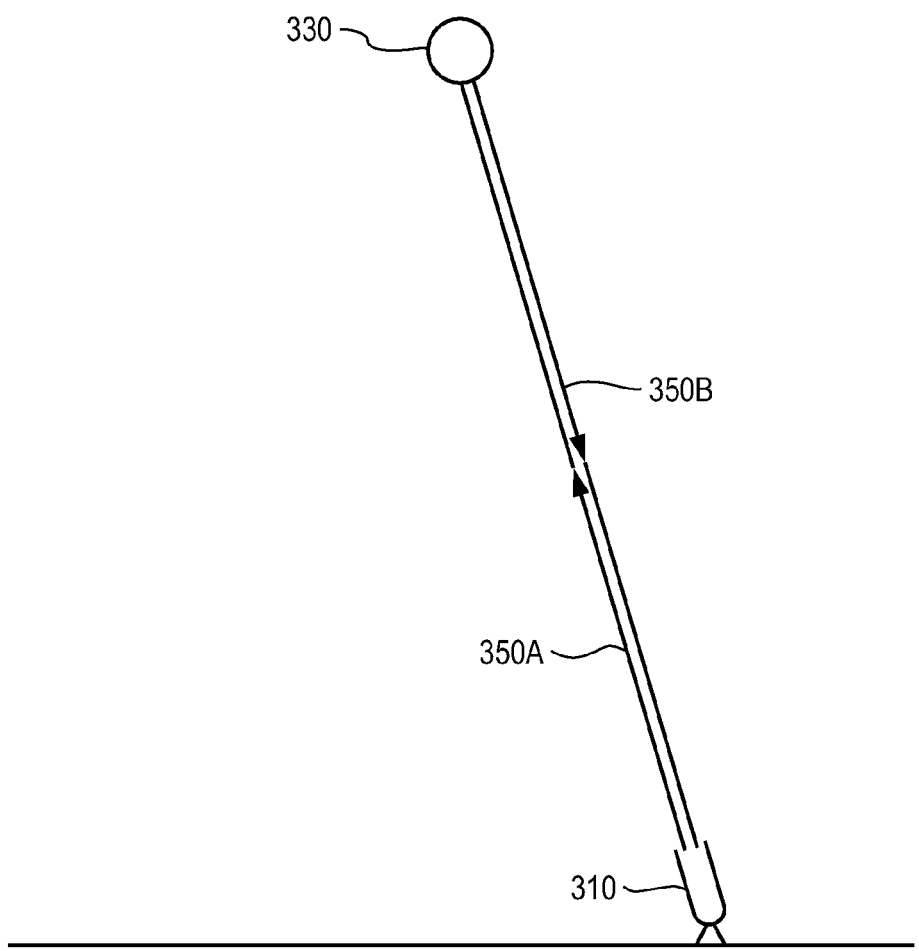
FIG. 3 is an illustration of another free space optical communications system suitable for use with the present invention.

The asymmetric optical circulator 100 is beneficial because the optical beam 122 exiting via free space port 120 can have different qualities than the optical beam 124 entering via free space port 120. FIGS. 2 and 3 show example of free space optical communications systems where the optical beam exiting a transceiver has different qualities than the optical beam entering the transceiver. The asymmetric optical circulator 100 described above can be used beneficially in these systems.

In FIG. 2, the free space optical communications system is used in an urban environment where a transmitter 210 and receiver 220 are located on the roofs of two buildings. For convenience, the term "transceiver" will be used to refer to modules that only transmit 210 and to modules that only receive 220, as well as to modules that both transmit and receive.

Each transceiver 210, 220 includes a telescope that is pointed at the telescope of the other transceiver. The transmitting telescope 210 typically includes components for tracking and directing an optical beam 250 to the receiving telescope 220. The receiving telescope 220 typically includes components for following and receiving the optical beam 250 from the transmitting telescope 210. Examples of components that can be used for these purposes include steering mirrors, mechanical gimbals, tracking mechanisms and control loops, auto-focus and zoom capability.

The free space optical communications link 250 can suffer from time-varying aberrations. For example, for many applications, the effect of the atmosphere can be a significant source of aberrations. The density of the atmosphere generally varies across time and space, typically at a rate of about 2 kHz or less for turbulent cells. The resulting aberrations can cause unwanted effects, such as divergence resulting in beam wander, scintillation patterns at the receiver 220 and degraded wavefronts.

FIG. 2 shows buildings of different heights, automobiles, roadways, trees and a smoke stack on one building, which create different atmospheric conditions. Rain, fog, smoke and the like lower the intensity of the transmitted light. Conditions such as sun-induced and structure-created heat waves, air conditioning discharges, heat exchanger discharges, automobile exhaust, etc. create aberrations along the optical link 250 in addition to the normal atmospheric aberrations caused by weather conditions. In rural applications, the varying terrain and vegetation can influence the aberrations along the optical link 250.

In FIG. 2, each transceiver 210, 220 includes an adaptive optics module 215, 225 operably coupled to the telescope, in order to mitigate the atmospheric conditions that otherwise would adversely affect the transmission and reception of light waves. In the transmitter 210, the adaptive optics 215 pre-corrects the wavefront of the outgoing light. This pre-correction reduces beam wander and scintillation patterns at the receiver 220, thus increasing the amount of light incident on the receiver 220 and also improving the wavefront quality of the received optical beam. At the receiver 220, the adaptive optics 225 corrects aberrations in the received wavefront, thus improving the image quality and/or collection efficiency at the receiver.

At the receiver 220, the wavefront correction applied by the adaptive optics module 225 is determined based on the wavefront of the incoming optical beam 250. A counter-propagating probe beam 260 is used for the adaptive optics module 215 at the transmitter 210. The probe beam 260 propagates along approximately the same optical path as the primary data-encoded beam 250, but in the opposite direction. It can be the same wavelength as or a different wavelength than the primary beam 250. The probe beam 260 experiences substantially the same aberrations as the primary beam 250 and the pre-correction applied by the adaptive optics module 215 is based on the wavefront of the probe beam 260. In a similar fashion, a co-propagating probe beam (not shown in FIG. 2) could be used at the receiver 225 as the basis for correcting the wavefront of the primary beam 250, rather than using the primary beam 250 itself.

The communications link 250 is shown as unidirectional. Two separate unidirectional systems can be used to create a bi-directional system. More economically the transmitter and receiver at each location can be combined into a single unit, for example by providing both a data source (e.g., a modulated laser or a fiber optic feed) and a data receiver (e.g., a photodetector or an outgoing optical fiber) at each transceiver 210, 220 and sharing much of the same telescope optics, including adaptive optics correction.

For example, in FIG. 2, optical beam 260 could also be encoded with data. Then, for data transmission from 210 to 220, transceiver 210 is the transmitter, beam 250 is the data-encoded primary beam, beam 260 is the probe beam, and transceiver 220 is the receiver. In the reverse direction, transceiver 220 is the transmitter, beam 260 is the data-encoded primary beam, beam 250 is the probe beam, and transceiver 210 is the receiver. Note that each beam 250, 260 serves two purposes. It is the data encoded primary beam in one direction and the probe beam in the other direction. In addition, each adaptive optics module 215, 225 pre-corrects beams that are leaving that transceiver and post-corrects beams received by that transceiver. An alternate implementation uses four beams: two data-encoded beams and two probe beams, all sharing the same telescope optics at both transceivers 210, 220.

FIG. 3 is an illustration of another free space optical communications system suitable for use with the invention. This example uses a modulated retro reflector 330. The transceiver 310 transmits an optical beam 350A to the retro reflector 330. Modulation of the retro reflector 330 encodes data onto the beam and the retro reflector 330 reflects the data-encoded beam 350B back to the general vicinity of the original source 310. The transmitting telescope 310 receives the return beam 350B. An adaptive optics module can be used to pre- and/or post-correct the optical beam 350.

Note that at each of the transceivers in FIGS. 2 and 3, the beam transmitted from a telescope preferably is diffraction limited. This yields a small spot at the far field, concentrating more energy at the receiving telescope. A single mode fiber is a good source to produce this type of beam. In contrast, the optical beam received by the telescope typically will not be diffraction limited. At long link distances with low aberrations, the received beam typically will have a uniform intensity across the aperture of the receiving telescope. This is not the ideal intensity profile for efficient coupling into a single mode fiber; the ideal intensity profile is a Gaussian profile. To make matters worse, under strong scintillation conditions, the pupil illumination may include significant speckle, making it even more difficult to efficiently couple into a single mode fiber. Thus, a multimode fiber is preferred for coupling of the received beam.

Figure 4:
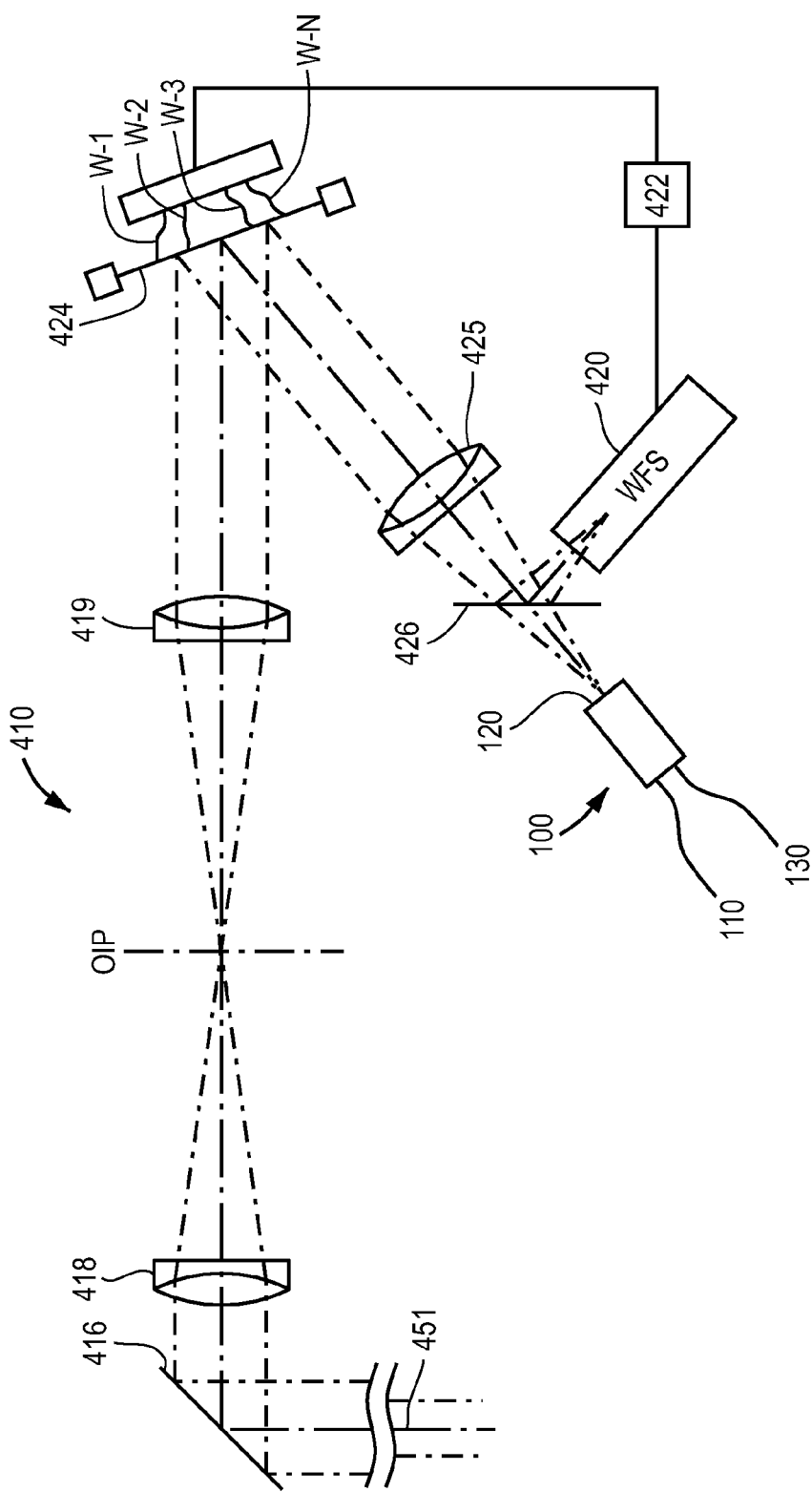
FIG. 4 is an illustration of an example optical train for a transceiver suitable for use with the systems shown in FIGS. 2 and 3.

FIG. 4 is an illustration of an example optical train for a transceiver suitable for use with the systems shown in FIGS. 2 and 3. The system includes a telescope 410, a deformable mirror 424 and a wavefront sensor 420. The deformable mirror 424 and wavefront sensor 420 are located in the optical path of the telescope, with the wavefront sensor 420 downstream of the deformable mirror 424. This system also includes an asymmetric optical circulator 100, with the free space port 120 of the optical circulator operably coupled to the rest of the optical train.

In the receive direction, the system collects light 451 from a remote source (e.g., from the transmitting telescope) and couples it into the free space port 120. The light then exits via fiber optic port 130 (a multimode fiber). In more detail, the light rays travel through a lens 418 that focuses the light rays on an object image plane OIP where the image of the remote light source exists in focus but is uncorrected. The light rays then pass through a collimating lens 419 to a deformable mirror 424. The deformable mirror 424 is dynamically shaped to correct for aberrations in the wavefront. It is controlled according to wavefront measurements made by the wavefront sensor 420. A conjugate tuning element located at the OIP allows adjustment of the conjugate planes for the deformable mirror 424.

The deformable mirror 424 and wavefront sensor 420 form an adaptive optics loop that compensates for aberrations along the free space optical communications link. The deformable mirror 424 introduces an adjustable phase that compensates for the effects of unwanted aberrations, thus reducing the residual aberration in the wavefront. Examples of adjustable phase devices other than deformable mirrors include liquid crystal devices, MEMS mirrors, acousto-optic, thermo-optic, magneto-optic and electro-optic modulators, eidophors and optically written optically active materials devices. In this particular example, the deformable mirror is a deformable curvature mirror based on applying different voltages across different areas of a piezoelectric material, thus causing deformation. Further details for this type of deformable mirror are described and shown in U.S. Pat. No. 6,464,364, "Deformable Curvature Mirror," filed Jan. 25, 2001 and issued Oct. 15, 2002, by J. Elon Graves and Malcolm J. Northcott; U.S. Pat. No. 6,568,647, "Mounting Apparatus for Deformable Mirror," filed Jan. 25, 2001 and issued May 27, 2003, by J. Elon Graves and Malcolm J. Northcott; and U.S. Pat. No. 6,721,510, "Atmospheric Optical Data Transmission System," filed Jun. 16, 2001 and issued Apr. 13, 2004, by J. Elon Graves and Malcolm J. Northcott. All of the foregoing are incorporated herein by reference.

The wavefront sensor 420 takes a measure of the actual amount of residual aberration after correction and the deformable mirror 424 is controlled accordingly. In this example, a portion of the corrected wavefront is tapped by beamsplitter 426 and directed to the wavefront sensor 420. The wavefront sensor 420 measures the residual aberration and control module 422 sends the corresponding control signals to the deformable mirror 424. In this way, the wavefront of the incoming optical beam can be corrected for aberrations, resulting in better image quality and/or collection efficiency at the free space port 120. Examples of wavefront sensors 420 include Hartmann-Shack wavefront sensors and wavefront curvature sensors. In this example, the wavefront sensor 420 is a wavefront curvature sensor based on defocused pupil images. Further details for this type of wavefront curvature sensor are described and shown in U.S. Pat. No. 6,452,145, "Method and Apparatus for Wavefront Sensing," filed May 26, 2000 and issued Sep. 17, 2002, by J. Elon Graves and Malcolm J. Northcott; and U.S. Pat. No. 6,721,510, "Atmospheric Optical Data Transmission System," filed Jun. 16, 2001 and issued Apr. 13, 2004 by J. Elon Graves and Malcolm J. Northcott. All of the foregoing are incorporated herein by this reference.

In the transmit direction, the single mode fiber 110 is used to generate a diffraction-limited optical beam that is transmitted over the same free space optical communications link as the received optical beam. The optical beam from the source 110 is pre-corrected by the deformable mirror 424. This increases the amount of energy incident on the receiving telescope and can also reduce scintillation effects. Note that much of the optical path traveled by the received optical beam and by the transmitted optical beam is common. Thus, the same adaptive optics correction can be applied both to post-correct the received optical beam and to pre-correct the transmitted optical beam.

The adaptive optics preferably corrects the wavefront at a rate that is significantly faster than the rate of change of aberrations along the optical path, for example preferably faster by about a factor of ten or more. If the aberrations are primarily caused by atmospheric conditions, it is desirable that the deformable mirror 424 make adjustments at a rate of about 10 kHz or greater since turbulence microcells in the atmosphere change at a rate of about 1 kHz.

The figures shown above are merely examples. Other implementations will be apparent. For example, referring to FIG. 4, the optical paths for the transmitted beam and the received beam may not be exactly counter-propagating. They may be slightly separated. For example, if a ground-based transceiver is communicating with a satellite, the transmitted beam may be required to "lead" the received beam in order to account for the satellite's motion. This point-ahead requirement will result in slightly separated optical paths for the transmitted beam and the received beam. The beams may be separated in space and/or in angle at the point where they are incident on the free space port 120. The separation of optical paths may also be adjustable by adjusting the positions of the optical fibers 110 and/or 130. For example, if multimode fiber 130 can be translated in a direction perpendicular to the optical axis, this can be used to move the optical paths of the two beams relative to each other.

Furthermore, the choice of wavelengths, data rate, link distance, telescope design, data sources and light sources, data receivers and other design choices will depend on the application. Data rates and distances upwards of 100 Gbps and 27 km have been experimentally demonstrated, although different combinations of data rates and distances can be appropriate depending on the application. Wavelengths in the 1.55 μm (micron) wavelength region are currently preferred for telecommunications applications, although other wavelengths may be used and even preferred under certain atmospheric conditions or for other types of applications. For instance, the 1.3 μm wavelength region may perform well in a single wavelength mode. Terms such as "optical" or "light" are not intended to be limited to any one specific wavelength range. Nor are they meant to be limited to the visible region of the electromagnetic spectrum.

The adaptive optics module can also have different levels of sophistication. In simple applications, correction of only tip/tilt with or without focus may be sufficient. In more demanding applications, correction of higher order aberrations can be implemented. Simple first order adaptive optics corrections such as tip/tilt may be implemented or augmented by other components such as a steering mirror, leaving the adaptive optics module to correct for higher order aberrations. Alternately, the asymmetric optical circulator can be used in systems with no adaptive optics capability.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An asymmetric optical circulator comprising:
a first port comprising a first optical fiber;
a free space second port;
a third port comprising a second multimode optical fiber with a different coupling characteristic than that of the first optical fiber; and
a circulator core for coupling light received at the first port to the free space second port, the light exiting the free space second port along a first free space optical path; and further for coupling light received at the free space second port along a second free space optical path to the third port, wherein the first and second free space optical paths are substantially counter-propagating.

2. The asymmetric optical circulator of claim 1 wherein the first optical fiber is a single mode fiber.

3. An asymmetric optical circulator comprising:
a first port comprising a first single mode optical fiber;
a free space second port;
a third port comprising a second multimode optical fiber with a different coupling characteristic than that of the first single mode optical fiber;
a circulator core for coupling light received at the first port to the free space second port, the light exiting the free space second port along a first free space optical path; and further for coupling light received at the free space second port along a second free space optical path to the third port, wherein the first and second free space optical paths are substantially counter-propagating; and
a dual fiber collimator for coupling the first and second optical fibers to the circulator core.

4. An asymmetric optical circulator comprising:
a first port comprising a first multimode optical fiber;
a free space second port;
a third port comprising a second multimode optical fiber with a different coupling characteristic than that of the first multimode optical fiber, wherein the first and second multimode optical fibers support different numbers of modes; and
a circulator core for coupling light received at the first port to the free space second port, the light exiting the free space second port along a first free space optical path; and further for coupling light received at the free space second port along a second free space optical path to the third port, wherein the first and second free space optical paths are substantially counter-propagating.

5. The asymmetric optical circulator of claim 1 wherein coupling characteristics include acceptance angle and acceptance aperture size.

6. The asymmetric optical circulator of claim 1 wherein the first and second free space optical paths are exactly counter-propagating.

7. The asymmetric optical circulator of claim 1 wherein the first and second free space optical paths are substantially counter-propagating but not exactly counter-propagating.

8. The asymmetric optical circulator of claim 7 wherein the first and second free space optical paths are incident upon the circulator core at the same location but at slightly different angles.

9. The asymmetric optical circulator of claim 1 wherein at least one of the first and second optical fibers can be translated relative to the circulator core.

10. The asymmetric optical circulator of claim 1 wherein the circulator core is based on beam displacement.

11. The asymmetric optical circulator of claim 1 wherein the circulator core is based on angular displacement.

12. The asymmetric optical circulator of claim 1 further comprising:
a GRIN lens coupled to the circulator core.

13. The asymmetric optical circulator of claim 1 wherein the optical fibers and the circulator core are suitable for operation at wavelengths within the 1.3 µm range.

14. The asymmetric optical circulator of claim 1 wherein the optical fibers and the circulator core are suitable for operation at wavelengths within the 1.5 µm range.

15. A transceiver for use in a free space optical communications system, the transceiver comprising:
an asymmetric optical circulator having a first port comprising a first optical fiber, a free space second port and a third port comprising a second optical fiber with a different coupling characteristic than that of the first optical fiber, wherein the optical circulator couples first light received at the first port to the free space second port and further couples second light received at the free space second port to the third port; and
a telescope operably coupled to the free space second port of the optical circulator, the telescope for transmitting the first light along a first free space optical path and further for receiving the second light along a second free space optical path, wherein the first and second free space optical paths are substantially counter-propagating.

16. The transceiver of claim 15 wherein the first optical fiber is a single mode fiber and the second optical fiber is a multimode fiber.

17. The transceiver of claim 15 wherein the first and second free space optical paths are exactly counter-propagating.

18. The transceiver of claim 15 wherein the first and second free space optical paths are substantially counter-propagating but separated to account for point ahead.

19. The transceiver of claim 15 wherein at least one of the first and second optical fibers can be translated relative to the circulator core.

20. The transceiver of claim 15 wherein the first light and the second light have wavelengths within the 1.3 µm range.

21. The transceiver of claim 15 wherein the first light and the second light have wavelengths within the 1.5 µm range.

22. The device of claim 15 further comprising:
an adaptive optics system operably coupled to the telescope for correcting a wavefront of at least one of the first light and the second light.

23. The device of claim 22 wherein the adaptive optics system pre-corrects a wavefront of the first light and post-corrects a wavefront of the second light.

24. The device of claim 15 wherein both the first light and the second light are data encoded.

25. The device of claim 15 wherein the first light is data encoded and the second light is not data encoded.

26. The device of claim 15 wherein the first light is not data encoded and the second light is data encoded.

27. The device of claim 15 wherein the second light is a retro-reflected version of the first light.

* * * * *